United States Patent [19]

Augoyard

[11] Patent Number: 4,560,424
[45] Date of Patent: Dec. 24, 1985

[54] PROCESS FOR FORMING A PRESTRESS ANCHORAGE BY DRAWING A STEEL SLEEVE OVER A METAL CORE

[75] Inventor: Jean-Pierre Augoyard, Domont, France

[73] Assignee: G.T.M.-Entrepose, Nanterre, France

[21] Appl. No.: 627,357

[22] Filed: Jul. 3, 1984

[30] Foreign Application Priority Data

Jul. 6, 1983 [FR] France .................. 83 11234

[51] Int. Cl.⁴ .................. C21D 1/10; C21D 1/40; C21D 1/42
[52] U.S. Cl. .................. 148/150; 24/129 W; 29/452; 29/520; 148/39; 148/152; 403/282
[58] Field of Search .................. 29/517, 520, 452, 459, 29/DIG. 24, DIG. 21; 148/20.6, 150, 39, 152, 127; 403/282, 274; 24/129 W

[56] References Cited

U.S. PATENT DOCUMENTS

| | | | |
|---|---|---|---|
| 2,256,455 | 9/1941 | Crawford | 148/150 X |
| 2,315,558 | 4/1943 | Somes | 148/150 |
| 2,357,733 | 9/1944 | Guderian | 403/282 |
| 2,375,481 | 5/1945 | Lee et al. | 29/459 X |
| 2,604,419 | 7/1952 | Herbenar | 148/150 |
| 2,638,367 | 5/1953 | Bergan | 403/274 |
| 2,832,118 | 4/1958 | Ehmann | 29/517 X |
| 3,559,270 | 2/1971 | Beghi | 29/520 X |
| 3,583,060 | 6/1971 | Sigmans | 29/517 X |
| 3,748,723 | 7/1973 | Tomioka | 29/517 |
| 4,261,769 | 4/1981 | Usui | 148/39 |

Primary Examiner—Charlie T. Moon
Attorney, Agent, or Firm—Amster, Rothstein & Engelberg

[57] ABSTRACT

A process for forming a prestressed anchorage by drawing a steel sleeve over a metal core of elongate shape having a substantially round section, consisting in using a sleeve having an inner diameter substantially equal to the outer diameter of the metal core, in forming a grooved portion or indentations in the inner cylindrical surface of the sleeve, in subjecting the inner cylindrical surface of the sleeve and its grooving to surface heat treatment adapted to increase the hardness thereof and to give thereto a value greater than that of the metal core, by causing the tempering depth to increase from one end to the other of the sleeve and in anchoring the sleeve on the metal core, in a way known per se, by drawing the sleeve through a draw-plate.

4 Claims, 4 Drawing Figures

U.S. Patent Dec. 24, 1985 4,560,424
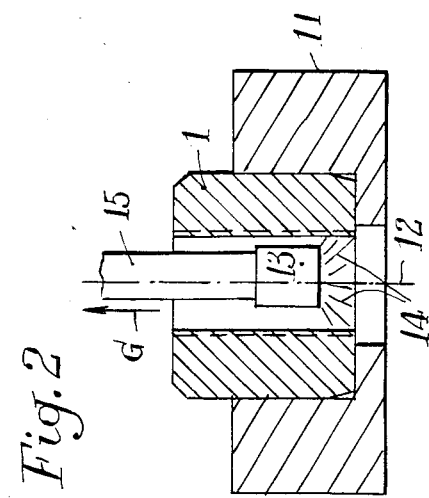
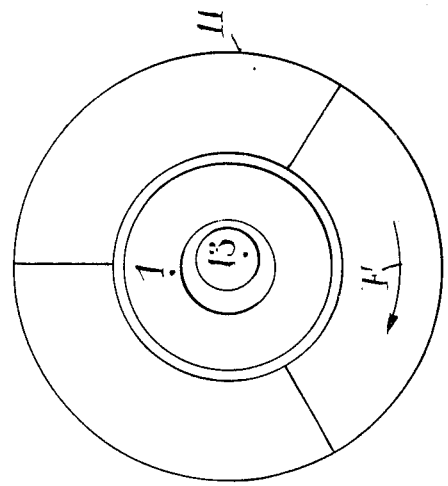
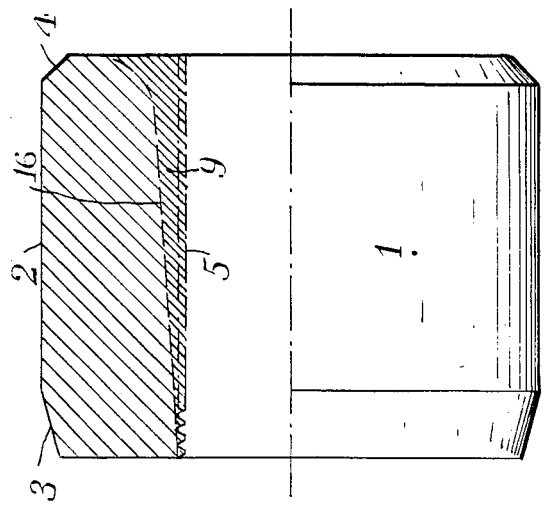
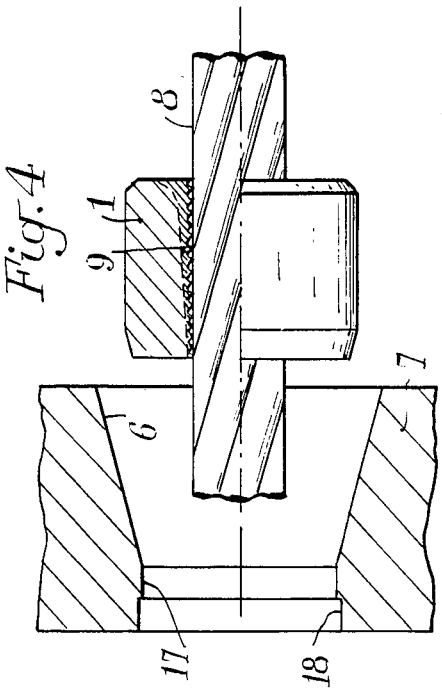

PROCESS FOR FORMING A PRESTRESS ANCHORAGE BY DRAWING A STEEL SLEEVE OVER A METAL CORE

BACKGROUND OF THE INVENTION

1. Field of the Invention

The present invention relates to a process for forming a prestress anchorage by drawing a steel sleeve over an elongate metal core having substantially round section.

2. Description of the Prior Art

In the technique for manufacturing prestressed concrete part, the concrete part to be prestressed is subjected to compression by jacks which bear against the concrete and which pull one or more metal bars or more metal cables passing through one or more sheaths buried in the concrete, the metal bars or the metal cables being then locked by anchorage against the concrete. In some known techniques for forming anchorages (see for example patents FR Nos. 1241 157 and 1530 660 and the patent U.S. Pat. No. 3,559,270,) a metal sleeve is anchored at least at one end of each cable or each metal bar by being drawn through a draw-plate, so as to form an anchorage head adapted to abut against a bearing plate, this latter itself bearing against the concrete in the case of a dead anchorage or being possibly connected to the pulling jack in the case of an active or mobile anchorage. It is evident that the anchorage between the metal sleeve and the metal cable or bar must be able to withstand the intense pulling forces to which the cable or the bar is subjected in use, in general several tens of tons-force (a ton-force is equivalent to $0.98.10^3$ daN), even more than 100 tons-force, without the metal sleeve sliding or becoming detached from the metal bar or cable. Among the known processes for forming such an anchorage by drawing a steel sleeve over a bar or a metal cable, a sleeve is generally used having an inner diameter greater than the the outer diameter of the metal bar or cable on which the sleeve is to be anchored, and between the sleeve and the cable or the bar is interposed a metal insert, grooved on the inside and made rough on the outside by indenting or by milling, namely a helical spring with jointing turns made from tempered steel as is stated in the two above mentioned French patents. In both cases, the metal insert or the helical spring is made from a material which has a hardness greater than that of the sleeve (the hardness of the sleeve having to be relatively low so as to allow it to be drawn through a draw-plate,) and greater than that of the metal bar or cable. Thus, during drawing of the sleeve, the metal insert or helical spring becomes incrusted in the outer surface of the metal bar or cable and provides anchorage between the sleeve and the bar or cable. However, to form an anchorage of the above described type, having a given breakage strength, it was necessary up to present to use a sleeve and a metal insert or helical spring having a relatively large length. Following tests carried out by the applicant, this may be explained in the following way. In so far as the anchorage are concerned having a metal insert, this latter reduces the effective volume of the material of the sleeve which participates in the anchorage, so that this reduction in volume must be compensated for by an increase in the length of the sleeve. In so far as anchorages are concerned having the helical spring, it has been discovered that the turns of the spring tend to slant or to lie down during the operation of drawing the sleeve and the spring is impressed or incrusted more or less evenly in the outer surface of the metal bar or cable, which reduces the efficiency of the anchorage.

Another process is known for butting together steel bars for reinforced concrete, which consists in using a sleeve which is threaded or toothed on the inside and whose inner toothed or threaded surface is hardened, the sleeve being then fixed on the two steel bars to be butted together by drawing a sleeve and the bars through a matrix (see patent CH No. 532.702).

The steel bars usually used for reinforced concrete generally have a breakage strength of 40 kg/mm$^2$, i.e. a much lower strength than that of the bars or the stranded cables used for prestress anchorages, which generally have a breakage strength of 180 kg/mm$^2$. In fact, in reinforced concrete, the bars are only subjected to tensile or compression forces due to the weight of the concrete work or to the load supported by this latter. On the other hand, as was pointed out above, in prestress anchorages, the bars or cables are permanently subjected to a very high tension, in general several tens of tons-force, even more than a 100 tons-force.

Moreover, it will be noted that in the patent CH No. 532.702, the inner teeth of the sleeve are surface hardened by application of a flame or case hardened. The thickness of the layer hardened by such a process is relatively small and would be quite inefficient for forming a prestress anchorage.

SUMMARY OF THE INVENTION

The aim of the present invention is then to provide a process for forming a pre-stress anchorage by drawing the steel sleeve over a metal core, allowing, for equal lengths of the sleeve, the efficiency of the anchorage between the sleeve and the metal core to be improved, that is to say its breakage strength to be increased with respect to prior known anchorages or, with equal breakage strength, allowing a sleeve to be used having a smaller length than the prior known anchorages.

To this end, the process of the invention consists in using the sleeve having an inner diameter substantially equal to the outer diameter of the metal cork, in forming grooving or indentation in the inner cylindrical surface of the sleeve, in subjecting said inner cylindrical surface of the sleeve and its grooving to a surface heat treatment adapted to increase the hardness thereof and to give it a value greater than that of the metal core while increasing the tempering depth from a first end of the sleeve, intended to be engaged first in a draw-plate, as far as the opposite end of the sleeve, and in anchoring the sleeve on the metal core in a known way, by drawing it through the draw-plate.

Preferably, the grooving operation consists in forming a threaded portion. The profile of the thread may have any desired form, although a triangular or trapezoidal form is preferred.

The superiority of the anchorage obtained by the process of the present invention with respect to prior known anchorages may be explained by the fact that a greater amount of the material of the sleeve participates in the anchorage, so that, for equal breakage strength, it becomes possible to reduce the length of the sleeve or, for equal lengths of the sleeve, a higher breakage strength is obtained. For equal breakage strengths, the result is a reduction in the length of the sleeve and, consequently, a reduction in the length of the anchorage of 40 to 50% and a saving of material of 30 to 35%. The result is also a saving in machining time, since there is now only a single piece to be machined instead of two. Furthermore, the tempered material layer of the sleeve behaves like an annular internal collar which improves the bursting strength of the sleeve under the intense forces to which it is subjected in use.

BRIEF DESCRIPTION OF THE DRAWINGS

One embodiment of the present invention will now be described by way of example with reference to the accompanying drawings in which:

FIG. 1 shows, partly in axial section and partly in elevation, a metal sleeve usable in the process of the present invention;

FIGS. 2 and 3, show, respectively in axial section and in a top view, an apparatus for the heat treatment of the sleeve of FIG. 1; and FIG. 4 shows the sleeve placed on a cable, just before the sleeve-cable assembly is passed through a draw-plate.

DESCRIPTION OF THE PREFERRED EMBODIMENT

The sleeve shown in FIG. 1 has an outer cylindrical surface 2 ending in two chamfers 3 and 4 and a grooved inner cylindrical surface 5. The chamfer 4 may for example have a slope of 45° whereas chamfer 3 has a slope of about 8°30′ corresponding to the slope of the input orifice 6 of the draw-plate 7 used for drawing the sleeve 1 over cable 8 (FIG. 4). The grooving of the inner cylindrical surface 5 may for example be a threaded portion whose thread has a triangular profile and extends helically over the whole axial length of the inner cylindrical surface 5 of sleeve 1.

As is shown at 9 by close hatching in FIGS. 1 and 4, the inner cylindrical surface 5 of sleeve 1 and its grooving are treated by a heat treatment adapted to confer thereon a hardness greater than that of cable 8. To this end, as shown in FIGS. 2 and 3, sleeve 1 is placed in clamping jaw 11 connected to drive means (not shown) adapted to rotate it about its axis 12 as shown by the arrow F in FIG. 3. An inductor 13 of the high frequency type, for example an inductor of the make "PARTIOT", is placed in an offcenter position inside the bore of sleeve 1 at a small distance from the inner cylindrical surface thereof. At its lower end, inductor 13 is provided with nozzles for projecting on the inner cylindrical surface of sleeve 1 a tempering liquid, as is shown schematically by the jets 14 in FIG. 2. At its upper end, inductor 13 is connected to a hollow rod 15, through which the inductor 13 is fed with power and the above mentioned nozzles are fed with tempering liquid. Rod 15 is connected to drive means (not shown) for moving it parallel to axis 12 as shown by arrow G in FIG. 2. The travel speed of rod 15 is variable so as to obtain a tempering depth which increases from one end to the other of the cylindrical inner surface 5 of sleeve 1 as is more particularly visible in FIG. 1. The travel speed of rod 15 and, consequently, of inductor 13 is preferably adjusted so that it decreases uniformly over the major part of the length of sleeve 1 from the lower end thereof (see in FIG. 2), i.e, from its end intended to be engaged first in the draw-plate 7, then so that is decreases more and more rapidly towards the opposite end of the sleeve. Thus, a tempering profile is obtained such as is shown by the broken line 16 in FIG. 1. With such a tempering profile, after the sleeve 1 and cable 8 assembly has passed through the orifice 7 in drawplate 7, an anchorage may be obtained between sleeve 1 and cable 8 whose anchorage force increases from the left hand end to the right hand end of sleeve 1 (seen in FIGS. 1 and 4).

By way of example, there is shown in the table below the dimensional characteristics of the sleeve of two prestress anchorages having a breakage strength of 25.7 tons-force (26.95.10$^3$ daN) in the case of a prior known anchorage with interposition of a spring between the sleeve and the cable and in the case of an anchorage of the present invention with a sleeve threaded on the inside, respectively.

| Dimensions of the Sleeve | | Conventional anchorage with spring | Anchorage with threaded sleeve |
|---|---|---|---|
| before drawing | exterior | 37.5 mm | 37.5 mm |
| | interior | 18 mm | 16 mm |
| | length | 50 mm | 30 mm |
| after drawing | exterior | 32 mm | 32 mm |
| | length | 62 mm | 37 mm |

In both cases, the cable was formed by a twisted cable having an outer diameter of 15.2 mm, formed from six steel strands each having a diameter of 5 mm, surrounding a central steel strand having a diameter of 5.2 mm. The cable had then a sectional steel area of 139 mm$^2$. The seven strands were made from a bright steel having a breakage resistance of 180 kg/mm$^2$ (about 180 daN/mm$^2$). In both cases the sleeve was made from 35 CD4 steel having a breakage resistance of 90 kg/mm$^2$ (about 90 daN/mm$^2$) and a rockwell C hardness of 27/29 HRC. In both cases, the input orifice 6 of the drawplate 7 had a slope of 8°30′ and a length of 30 mm, its orifice 17 had a diameter of 38.8 mm and a length of 5 mm and its outlet orifice had a diameter of 32 mm and a length of 5 mm.

In the case of the anchorage width and inner threaded sleeve, the inner threaded portion of the sleeve had a depth of 0.5 mm and a pitch of 1 mm. The sleeve had been treated with an inductor of the make "PARTIOT" described above, fed with current at a frequency of 200 kHz. The tempering liquid was an aqueous solution of polyalkylene glycol at a temperature between 25° and 35° C. The rotational speed of the clamping jaw 11 was 250 rpm, the average travel speed of the inductor 13 in a zone corresponding to the rectilinear part of profile 16 of FIG. 1 was 30 mm/S over a distance of 25 mm, whereas this average speed in the zone corresponding to the curved part of the profile 16 was 25 mm/s over the remaining distance of 5 mm. Thus, the tempering depth was about 0.5 mm at the end of the rectilinear part of profile 16 situated on the same side as chamfer 3, about 2.5 mm at the opposite end of the rectilinear part of profile 16 and about 7 mm at the outer end of the curved part of profile 16. After heat treatment, the tempered zone 9 of sleeve 1 had a rockwell C hardness of 62 HRC and a breakage resistance of 120 kg/mm$^2$ (about 220 daN/mm$^2$).

It goes without saying that the embodiment of the invention which has just been described above has been given by way of example which is purely indicative and in no wise limitative and that numerous modifications may be made by a man skilled in the art without for all that departing from the scope and spirit of the present invention.

Thus, although it is more convenient to form a threaded portion in the inner cylindrical surface 5 of sleeve 1, any other form of grooving or indentation could be made in the inner cylindrical surface 5, as for example a succession of circular grooves.

What is claimed is:

1. A process for forming a prestress anchorage by drawing a steel sleeve over a metal elongate core having a substantially rounded section, consisting in using a sleeve having an inner diameter substantially equal to the outer diameter of the metal core, in forming grooving or indentations in the inner cylindrical surface of the sleeve, in subjecting said inner cylindrical surface of the sleeve and its grooving to a surface heat treatment adapted to increase the hardness thereof and to give thereto a value greater than that of the metal core, by causing the tempering depth to increase from a first end of the sleeve, intended to be engaged first in a draw-plate, as far as the opposite end of the sleeve and in anchoring the sleeve on the metal core in a way known per se, by drawing through the draw-plate.

2. The process as claimed in claim 1, wherein the grooving operation consists in forming a threaded portion.

3. The process according to claim 1 or 2, wherein said heat treatment is carried out by means of a high frequency inductor, which is moved along the inner cylindrical surface of the sleeve at a speed which decreases from the first end of the sleeve to the opposite end of said sleeve.

4. The process as claimed in claim 3, wherein the inductor is moved at a speed which decreases uniformly from the first end of the sleeve over the major part of the length thereof, then at a speed which decreases more and more rapidly towards the opposite end of the sleeve.

* * * * *